United States Patent [19]

Fujiwara et al.

[11] Patent Number: 5,774,515
[45] Date of Patent: Jun. 30, 1998

[54] PARTICLE MEASURING APPARATUS, METHOD FOR PARTICLE MEASUREMENT, AND NUCLEAR POWER PLANT

[75] Inventors: Hirotsugu Fujiwara; Kazunori Ikegami; Hiroshi Nishizawa, all of Tokyo, Japan

[73] Assignee: Mitsubishi Denki Kabushiki Kaisha, Tokyo, Japan

[21] Appl. No.: 559,339

[22] Filed: Nov. 16, 1995

[30] Foreign Application Priority Data

Jun. 13, 1995 [JP] Japan ................................. 7-145801

[51] Int. Cl.⁶ .............................. G21C 17/00; G01T 1/20
[52] U.S. Cl. ........................ 376/254; 376/255; 376/259; 250/367
[58] Field of Search ..................................... 376/154, 254, 376/255, 258, 259; 250/366–369, 370.05, 370.06, 370.1, 370.11, 390.01, 390.03

[56] References Cited

U.S. PATENT DOCUMENTS

| | | | |
|---|---|---|---|
| 3,988,586 | 10/1976 | Stuart et al. ............................ | 250/367 |
| 4,804,514 | 2/1989 | Bartko et al. ........................... | 376/154 |
| 4,829,185 | 5/1989 | Cerff .................................. | 250/368 X |
| 4,931,646 | 6/1990 | Koechner ............................... | 250/367 |
| 5,155,366 | 10/1992 | Miller .................................. | 250/368 |
| 5,321,269 | 6/1994 | Kitaguchi et al. ................... | 250/370.05 |
| 5,481,114 | 1/1996 | Daniel et al. ....................... | 250/390.11 |
| 5,629,515 | 5/1997 | Maekawa ............................. | 250/367 X |

FOREIGN PATENT DOCUMENTS 540191   2/1993   Japan .

OTHER PUBLICATIONS

Spector et al., "Scintillator Fiber Optic . . . MeV+", Nuclear Instru. and Methods in Physics Research, Sec. A 346 (1994), pp. 273–278.

*Primary Examiner*—Charles T. Jordan
*Assistant Examiner*—Matthew J. Lattig
*Attorney, Agent, or Firm*—Rothwell, Figg, Ernst & Kurz

[57] ABSTRACT

A neutron particle measuring apparatus includes a neutron converter to generate alpha rays in response to incidence of neutron, a scintillator to receive as input the alpha rays generated from the neutron converter so as to emit and transmit scintillation, two photoreceptive portions to receive the scintillation through different transmitting paths, and a signal processing portion to measure a neutron distribution depending upon times at which the scintillation can reach the photoreceptive portions according to a time-of-flight method. The single particle measuring apparatus can be used to measure the neutron distribution in the vicinity of a nuclear reactor in a nuclear power plant.

23 Claims, 17 Drawing Sheets

F I G. 8
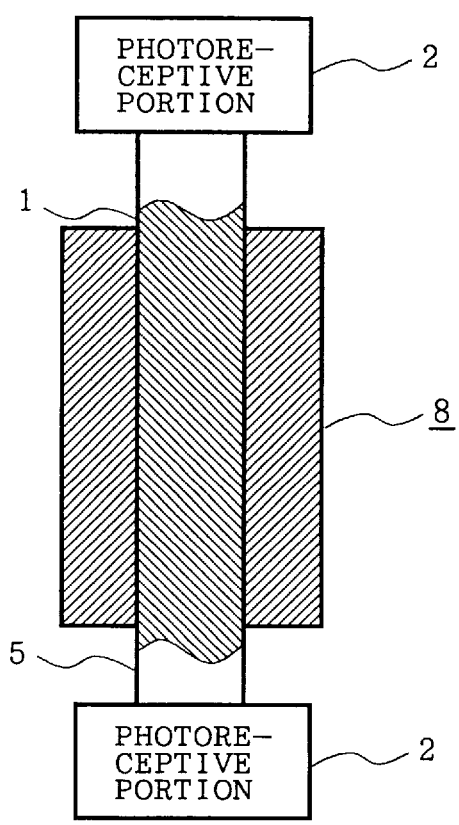

F I G. 1 2
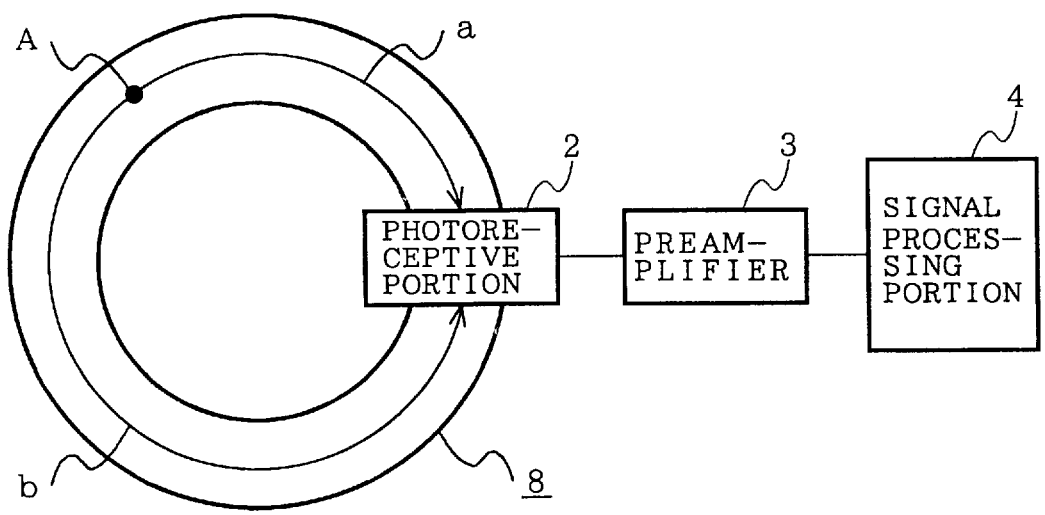

F I G. 1 4
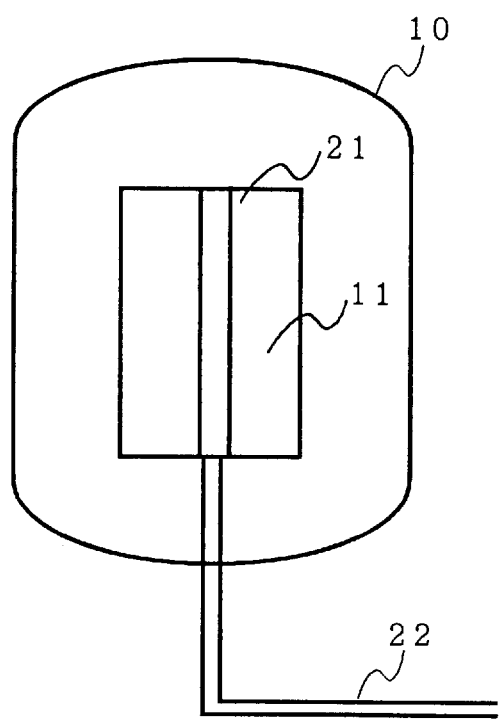

PARTICLE MEASURING APPARATUS, METHOD FOR PARTICLE MEASUREMENT, AND NUCLEAR POWER PLANT

BACKGROUND OF THE INVENTION

1. Field of the Invention

The present invention relates to an apparatus for measuring particle generated in a nuclear power plant, a method for particle measurement, and a nuclear power plant employing the particle measuring apparatus. In particular, particle measurement in the invention relates to neutron measurement and gamma rays measurement.

2. Description of the Prior Art

FIG. 15 is a sectional view showing a structure of a conventional neutron detector disclosed in Japanese Patent Publication (Kokai) No. 5-40191. In FIG. 15, reference numeral 51 means a gas scintillator to generate scintillation when charged particles pass therethrough, 52 is a fluorescent glass to focus the scintillation, 53 is a container including the scintillator 51 and the fluorescent glass 52, 54 is an optical fiber to transmit the scintillation, 55 is a connector for optically connecting the fluorescent glass 52 and the optical fiber 54, and 56 is neutrons (neutron fluxes) incident on the container 53.

In this case, as well as the scintillator 51, a neutron converter (not shown) is sealed in the container 53 so as to generate charged particles when the neutrons pass through the neutron converter. Thus, when the neutrons are incident on the container 53, the charged particles are generated. Further, the generating charged particles cause the scintillation. Consequently, there is generated the scintillation whose quantity is identical with that of neutrons incident on the container 53.

The scintillator emits a light in response to the neutrons incident on the gas scintillator 51, and the emitting scintillation is collected by the fluorescent glass 52. The gas scintillator 51 and the fluorescent glass 52 are sealed in the container 53. Further, the connector 55 serves as a cover to seal the container 53, and transmits the scintillation collected by the fluorescent glass 52 to the external optical fiber 54. A measuring apparatus (not shown) is connected to the optical fiber 54 so as to count the number of neutrons incident on the gas scintillator 51.

A description will now be given of a method for neutron measurement, in which an incident neutron distribution is measured. FIGS. 16 and 17 are explanatory views showing a conventional method for neutron measurement. In FIGS. 16 and 17, reference numeral 57 means a neutron detector to detect the incident neutron 56, and 58 is an area in which the neutron detector can be moved (i.e., the area between A and B).

In a case shown in FIG. 16, three neutron detectors 57 are aligned such that the neutron detectors 57 can extend perpendicular to an incidence direction of the neutron 56. Then, each of the neutron detectors 57 can detect the number of incident neutrons. Depending upon the result of detection at the three points, it is possible to measure the neutron distribution between A and B.

In a case shown in FIG. 17, one neutron detector 57 is disposed such that the neutron detector 57 can extend perpendicular to the incidence direction of the neutron 56. Then, the neutron detector 57 is reciprocated between A and B in the movement area 58 at regular time intervals. The neutron detector 57 can continuously detect the neutron between A and B. Depending upon the result of detection, it is possible to measure the neutron distribution between A and B.

A nuclear reactor includes the neutron, and ionizing radiation such as, mainly, the gamma rays. The charged particles incident on the container 53 include the charged particle generated by the neutron converter, and the existing ionizing radiation in the nuclear reactor. In the neutron detector as described above, it is impossible to identify lights emitted by these charged particles with high accuracy.

As set forth above, in order to measure the neutron (neutron flux) distribution serving as a parameter for power control of the nuclear reactor, it is necessary to move the neutron detector, or dispose the plurality of neutron detectors. If the plurality of neutron detectors are disposed, it is necessary to provide the optical fibers whose number is identical with the number of neutron detectors.

In addition, since measurement accuracy of the neutron distribution depends upon a length of the neutron detector and the number of neutron detectors, there is a problem of poor accuracy. On the other hand, if the neutron detector should be moved, there are the following problems. That is, it is necessary to provide a drive unit to move the neutron detector. The optical fiber is more easily cut off. Further, a long time is required to measure the whole measurement area, and it is impossible to measure the whole measurement area at the same time.

In the nuclear reactor, the gamma rays are inevitably generated at a position at which the neutron is generated. Thus, the neutron detector may detect the gamma rays as well as the neutron. Though the neutron can be discriminated from the gamma rays to some extent depending upon outputted pulse waveforms, many neutrons and gamma rays have substantially the same pulse waveform. As a result, it is impossible to discriminate the neutron from the gamma rays.

SUMMARY OF THE INVENTION

In view of the foregoing, it is an object of the present invention to provide a particle measuring apparatus, a method for particle measurement, and a nuclear power plant, in which particles to be measured are particularly neutron and gamma rays, and particle distributions generated in the vicinity of a nuclear reactor in the nuclear power plant can be measured by a single measuring apparatus at the same time.

It is another object of the present invention to provide a particle measuring apparatus, a method for particle measurement, and a nuclear power plant, in which only neutron can be measured from among particles including the neutron and gamma rays.

It is still another object of the present invention to provide a particle measuring apparatus, a method for particle measurement, and a nuclear power plant, in which a particle distribution can be measured with high density and high accuracy.

According to the present invention, for achieving the above-mentioned objects, there is provided a particle measuring apparatus including an emission transmitting mechanism to emit a light in response to incidence of ionizing radiation or charged particles, and transmit the light, a photoreceptive mechanism to receive the light through a plurality of different transmitting paths, and a signal processing mechanism to process an output signal from the photoreceptive mechanism.

The particle measuring apparatus can receive the light emitted in the emission transmitting mechanism through the plurality of different transmitting paths. Hence, there is caused a difference in times required for the light to reach the photoreceptive mechanism through the transmitting paths. As a result, it is thereby possible to measure a quantity of incident ionizing radiation, and measure a position of the emission transmitting mechanism, on which the ionizing radiation is incident. The ionizing radiation means, for example, gamma rays.

In one preferred mode, a particle measuring apparatus further includes a neutron/charged particle converting mechanism to generate charged particles in response to incidence of neutron, and the charged particles generated from the neutron/charged particle converting mechanism can be incident on the emission transmitting mechanism. The charged particles generated in response to incidence of the neutron are inputted into the emission transmitting mechanism, thereby emitting a light which is received through a plurality of different transmitting paths. Thus, there is caused a difference in times required for the light to reach the photoreceptive mechanism through the transmitting paths. As a result, it is thereby possible to measure the number of neutrons, and a position of the emission transmitting mechanism, on which the neutrons are incident.

Preferably, a neutron/charged particle converting mechanism is provided in a linear form so as to intersect neutron, and photoreceptive mechanisms are connected to both ends of the neutron/charged particle converting mechanism. Consequently, the neutron is incident in an axial direction of a neutron emission transmitting mechanism, and it is possible to measure a distribution of the neutron incident in the direction. Preferably, the emission transmitting mechanism is a solid scintillator, and the neutron/charged particle converting mechanism is a granular neutron converter. The neutron emission transmitting mechanism is formed by adding the neutron converter to the scintillator. Hence, an incidence position of the neutron corresponds to a position at which charged particles are generated by the neutron converter. As a result, it is possible to accurately detect the incidence position of the incident neutron, and provide finer resolution in neutron measurement.

In one preferred mode, a plurality of combinations of an emission transmitting mechanism and a neutron/charged particle converting mechanism. Even when one of the neutron emission transmitting mechanisms fails, the neutron can be measured.

Further, in one preferred mode, there are provided photoreceptive mechanisms whose number is identical with that of transmitting paths. As a result, light reaching the photoreceptive mechanism corresponds to light transmitted through the transmitting path, and a one-to-one correspondence is established between the transmitting paths and the photoreceptive mechanisms, resulting in finer resolution in light measurement. Further, preferably, a transmitting path includes an emission transmitting mechanism, and an optical transmission line for connecting the emission transmitting mechanism and the photoreceptive mechanism. As a result, it is possible to isolate the photoreceptive mechanism from the emission transmitting mechanism, and reduce electromagnetic noise which is generated in a photoreceptive element due to neutron or charged particle.

In one preferred mode, a particle measuring apparatus further includes a second emission transmitting mechanism to emit a light in response to incidence of ionizing radiation, and transmit the light. A first emission transmitting mechanism may be used for neutron, and the second emission transmitting mechanism may be used for the ionizing radiation such as gamma rays. In this case, the same quantity of ionizing radiation and neutron are incident on the emission transmitting mechanism. As a result, it is possible to cancel an effect of the ionizing radiation incident on the neutron emission transmitting mechanism, and measure only the neutron incident on the neutron emission transmitting mechanism. Further, preferably, the first and second emission transmitting mechanisms are optically connected in series. As a result, it is possible to reduce a restriction on arrangement of a photoreceptive mechanism or a transmitting path.

In one preferred mode, a particle measuring apparatus further includes an optical transmission line for interconnecting photoreceptive mechanisms, to which a wavelength converting material is added. Further, the optical transmission line passes through an emission transmitting mechanism and a neutron/charged particle converting mechanism. Therefore, it is unnecessary to connect the optical transmission line and a neutron emission transmitting mechanism. As a result, it is possible to realize a long-distance transmission of light without decreasing light-intensity.

Preferably, a signal processing mechanism includes a time-to-pulse height converting circuit to receive as input an output signal from a photoreceptive mechanism, and a multi-channel analyzer to receive as input a pulse signal from the time-to-pulse height converting circuit. As a result, it is possible to use a simple circuit so as to classify the pulse signal according to wave height, and measure an incidence distribution and a quantity of incidence of charged particle incident on an optical transmitting mechanism.

According to the present invention, there is provided a nuclear power plant to generate neutron according to nuclear fission or nuclear fusion in a nuclear reactor. The nuclear power plant is provided with a particle measuring apparatus including a neutron emission transmitting mechanism having a neutron/charged particle converting portion to generate charged particles in response to incidence of the neutron, and an emission transmitting portion to emit a light in response to incidence of the charged particles and transmit the light. The charged particles generated from the neutron/charged particle converting portion can be incident on the emission transmitting portion. Further, the particle measuring apparatus includes a photoreceptive mechanism to receive the light travelling through a plurality of different transmitting paths. The particle measuring apparatus measures the particle depending upon a difference in times required for the light travelling through the different transmitting paths to reach the photoreceptive mechanism, and upon the quantity of light. Further, the nuclear power plant is provided with a power control mechanism to control power of a nuclear reactor depending upon the result of measurement in the particle measuring apparatus. As a result, in the nuclear power plant, it is possible to reduce a rate occupied by the measuring apparatus disposed in the vicinity of the nuclear reactor, and measure a predetermined axial particle distribution.

Preferably, a particle measuring apparatus is disposed along a core axis of a nuclear reactor. As a result, it is possible to carry out particle distribution measurement in an area having a remarkable particle distribution. The particle measuring apparatus may be disposed in the nuclear reactor. Thus, it is possible to provide tremendous incidence energy of particle, and enhance measurement accuracy.

According to the present invention, there is provided a method for particle measurement including the steps of emitting a light in response to incidence of charged particles and transmitting the light, receiving by a photoreceptive portion the light travelling through at least two different transmitting paths, and measuring the charged particles depending upon a difference in times required for the light travelling through the different transmitting paths to reach the photoreceptive portion, and upon a quantity of light. As a result, it is possible to provide finer resolution in particle distribution measurement.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 8 is an explanatory view showing a structure of a neutron measuring apparatus according to one embodiment of the present invention, which is formed without an optical connecting portion;

FIG. 12 is an explanatory view showing a structure of a neutron measuring apparatus according to one embodiment of the present invention, to which a single photoreceptive portion is mounted;

FIG. 14 is an explanatory view showing a structure of a nuclear power plant according to one embodiment of the present invention, in which a neutron measuring apparatus is mounted in a nuclear reactor;

DETAILED DESCRIPTION OF THE PREFERRED EMBODIMENTS

Embodiment 1

Figure 1:
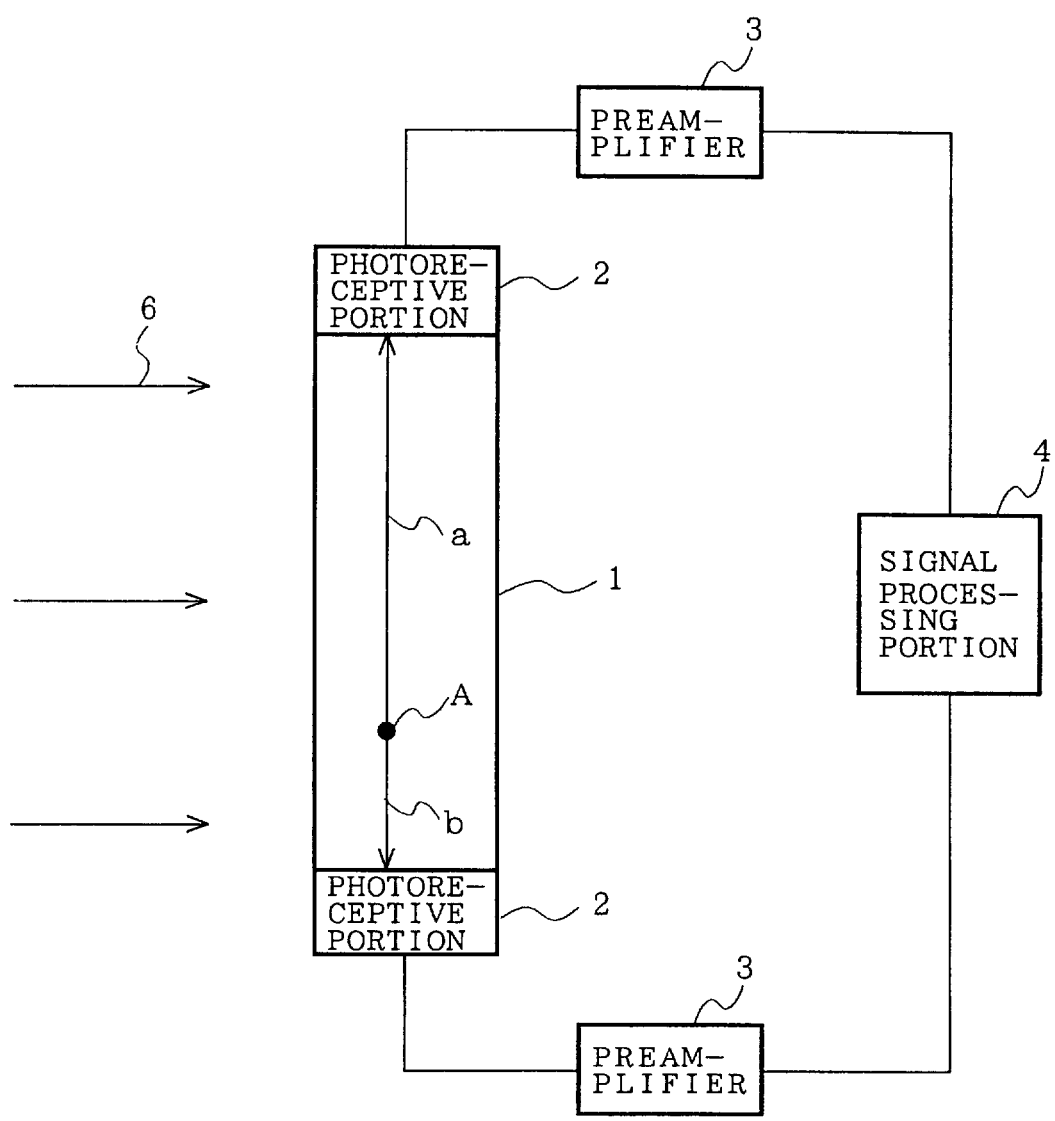
FIG. 1 is an explanatory view showing a structure of a particle measuring apparatus according to one embodiment of the present invention.

FIG. 1 is a block diagram showing a structure of a particle measuring apparatus according to one embodiment of the present invention. In the drawing, reference numeral 1 means an emission transmitting portion into which a scintillator gas is sealed, to emit a light in response to incidence of ionizing radiation and transmit the light, 2 is photoreceptive portions to receive scintillation emitted in the emission transmitting portion 1 so as to convert the light into electric information, 3 is preamplifiers to amplify electric output information from the photoreceptive portions 2, 4 is a signal processing portion in which signals outputted from the two preamplifiers 3 are processed to find a distribution of particles incident on the emission transmitting portion 1, and 6 is the ionizing radiation incident on the emission transmitting portion 1.

A description will now be given of a method for measurement. In the particle measuring apparatus having the above structure, when the ionizing radiation 6 is incident on the emission transmitting portion 1, the scintillation is generated. Subsequently, the scintillation reaches the two photoreceptive portions 2 connected to both ends of the emission transmitting portion 1 at different time points. The photoreceptive portion 2 generates and outputs a signal at a time of reception of the scintillation. The signal is amplified by the preamplifiers 3, and is inputted into the signal processing portion 4.

Here, a description will now be given of a case where the ionizing radiation 6 is incident on a point A. In this case, the scintillation can reach the photoreceptive portions 2 through two different transmitting paths a and b. Since the transmitting paths a and b are different in length, a time difference is caused in times required to reach the photoreceptive portions 2. Thus, the signal processing portion 4 detects a time difference in input times of the inputted signals. Further, it is possible to specify the lengths of the transmitting paths a and b depending upon the time difference. That is, the signal processing portion 4 can determine an incidence position of the incident ionizing radiation 6 (the method will hereinafter be referred to as time-of-flight method).

As set forth above, the incidence position of the incident ionizing radiation 6 can be determined, and a quantity of the incident ionizing radiation 6 can be counted. It is thereby possible to measure a position of the emission transmitting portion 1, on which the ionizing radiation 6 is incident, and how many ionizing radiations 6 are incident thereon. That is, by using one particle measuring apparatus, it is possible to measure an incidence distribution of the ionizing radiation 6 (charged particle flux) incident on the emission transmitting portion 1.

The description has been given of the ionizing radiation 6 serving as the particle. The particle measuring apparatus in the embodiment can be used in a nuclear power plant. In this case, the ionizing radiation 6 means, in particular, gamma rays. It is possible to accurately control, for example, power of the nuclear power plant by accurately measuring the gamma rays.

Embodiment 2

In power control of a nuclear power plant, a neutron (neutron flux) distribution can serve as a control parameter which is as important as or more important than the gamma rays. In the second or subsequent embodiment of the present invention, a description will be given of measurement of the neutron distribution. Hereinafter, for the sake of simplicity, a measuring apparatus to measure charged particles will be referred to as particle measuring apparatus, and a measuring apparatus to measure neutrons will be referred to as neutron measuring apparatus.

Figure 2:
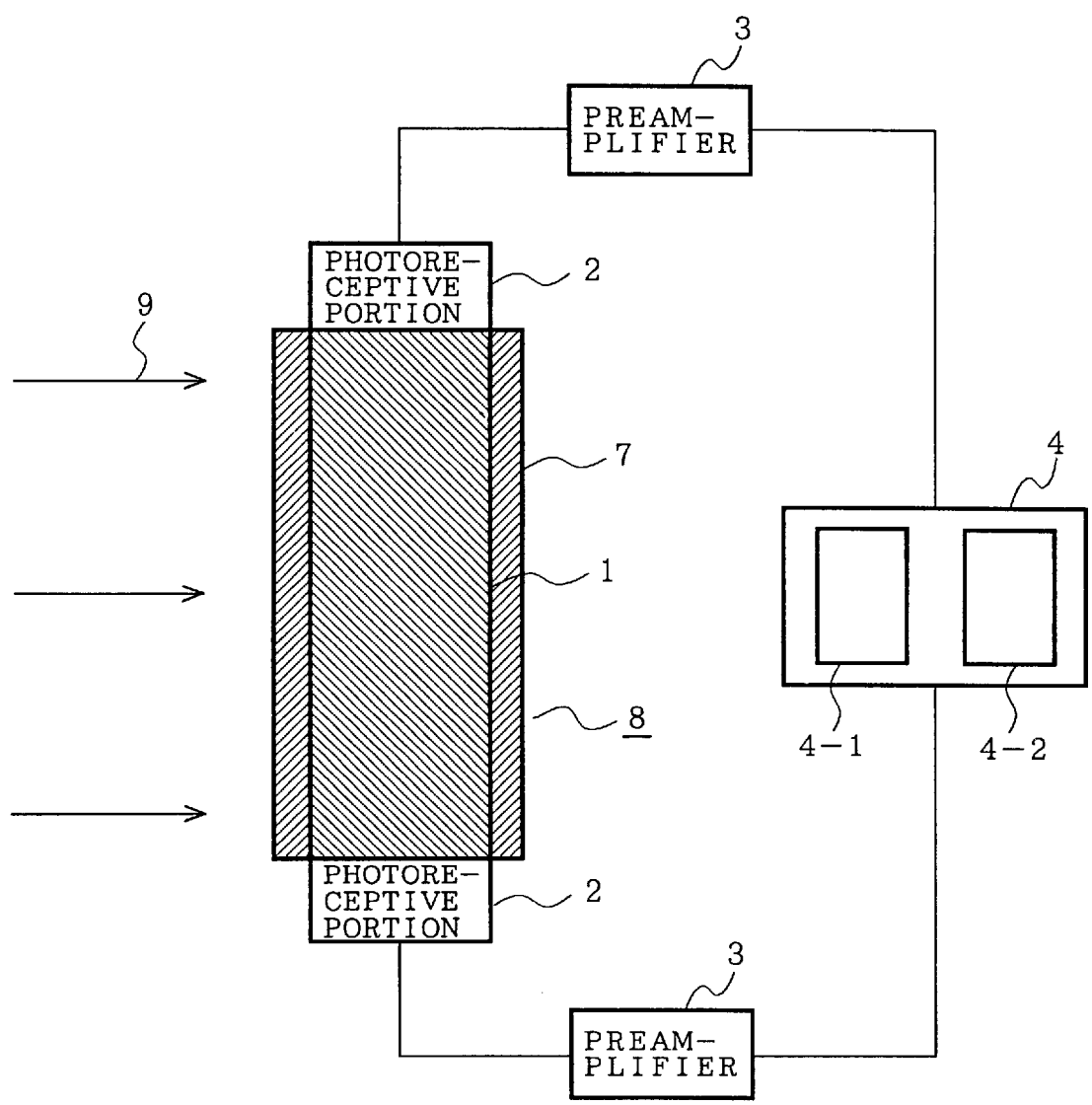
FIG. 2 is a partially broken explanatory view showing a structure of a neutron measuring apparatus according to one embodiment of the present invention.

FIG. 2 is a partially broken block diagram showing a structure of a neutron measuring apparatus according to one embodiment of the present invention. In the drawing, reference numeral 1 means an emission transmitting portion into which a scintillator gas is sealed, to emit a light in response to incidence of charged particles and transmit the light, 2 is photoreceptive portions to receive scintillation emitted in the emission transmitting portion 1 so as to convert the light into electric information, 3 is preamplifiers to amplify electric output information from the photoreceptive portions 2, 4 is a signal processing portion in which signals outputted from the two preamplifiers 3 are processed to find a distribution of particles incident on the emission transmitting portion 1, 7 is a neutron/charged particle converting portion to generate the charged particles in response to incidence of neutrons 9, 8 is a neutron emission transmitting portion including the emission transmitting 1 and the neutron/charged particle converting portion 7, and 9 is the neutrons incident on the neutron emission transmitting portion 8.

The emission transmitting portion 1 can be made of a scintillator. The scintillator 1 as used herein means a material to emit a light in response to incidence of the charged particle and transmit the light, and includes CsI(Tl) and so forth.

Preferably, the neutron/charged particle converting portion 7 is a neutron converter which is provided by using material containing lithium-6 and light hydrogen. In the neutron converter 7, by collision of the neutron, the charged particles such as alpha particle or recoil proton are generated according to the nuclear reaction such as $^6Li(n, a)^3H$, or $^1H(n, p)$. The neutron converter 7 is formed to cover the scintillator 1. Since the range of the alpha particle or the recoil proton generated in the neutron converter 7 is short, there is a one-to-one correspondence between emission positions of the scintillator 1 and incidence positions of the neutrons.

A description will now be given a method for measurement by using the neutron measuring apparatus having the above structure. The neutron 9 collides with the neutron converter 7 to generate the charged particles such as alpha particle or recoil proton. The charged particles are incident on the scintillator 1 to cause scintillation. The scintillation caused in the scintillator 1 reaches, at different time points, two photoelectric converters 2, serving as a photoreceptive portion, connected to both ends of the scintillator 1. The photoelectric converter 2 generates and outputs a signal in response to reaching light. The signals amplified by the preamplifiers 3 are inputted into the signal processing portion 4.

In addition, according to a time-of-flight method, an incidence position of the incident ionizing radiation 6 is determined, and a quantity of the incident ionizing radiation 6 is counted. It is thereby possible to measure a position of the emission transmitting portion 1, on which the ionizing radiation 6 is incident, and how many ionizing radiations 6 are incident thereon. In other words, it is possible to measure a position of the neutron converter 7, on which the neutron 9 is incident, and how many neutrons are incident thereon. That is, by using one particle measuring apparatus, it is possible to measure an incidence distribution of the neutron 9 incident on the neutron converter 7.

Further, the plurality of photoreceptive portions 2 are mounted so that a one-to-one correspondence is established between transmitting paths and photoreceptive portions, resulting in finer resolution in light measurement.

In the signal processing circuit 4, the signals inputted through the two paths are received by a time-to-pulse height converting circuit 4-1, and the time-to-pulse height converting circuit 4-1 generates a pulse signal depending upon a time difference in input times of the inputted signals. Subsequently, the pulse signal is outputted to a multi-channel analyzer 4-2. The multi-channel analyzer 4-2 analyzes a pulse height of a pulse waveform so as to find an incidence position of the neutron 9 incident on the neutron converter 7 and count the pulse. In such a manner, since the time-to-pulse height converting circuit 4-1 and the multi-channel analyzer 4-2 are used for signal processing, it is possible to measure the neutron 9 with high accuracy.

Embodiment 3

Figure 3:
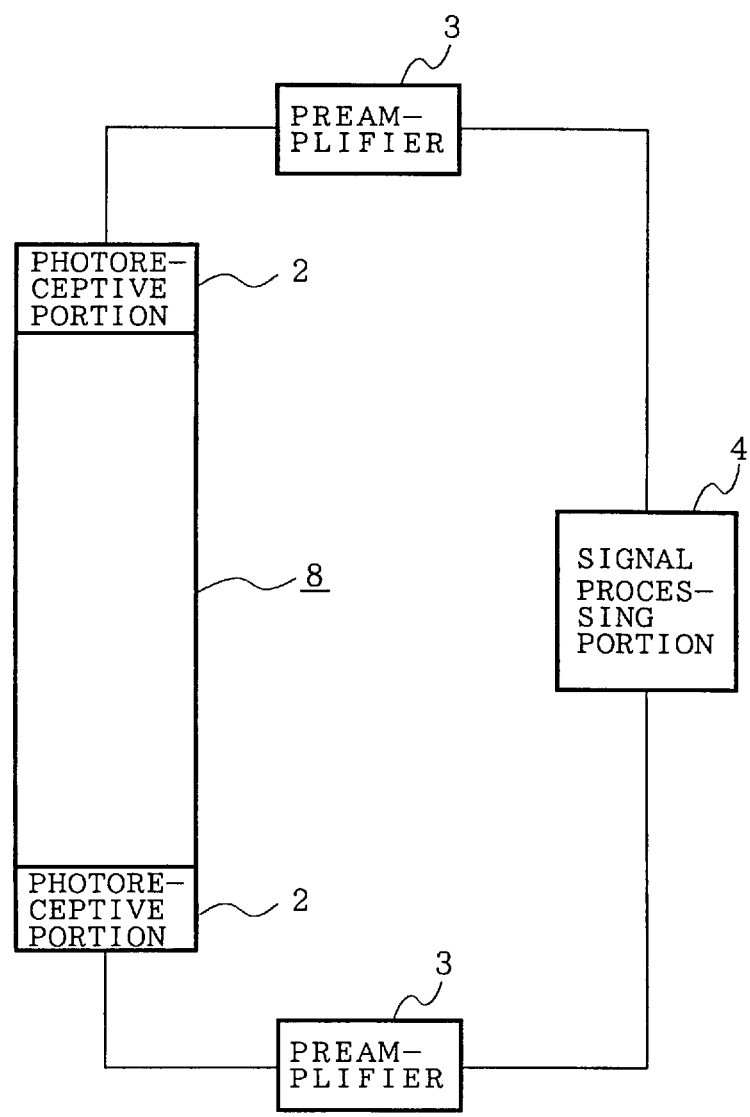
FIG. 3 is an explanatory view showing a structure of a neutron measuring apparatus according to one embodiment of the present invention, in which a neutron converter is added to a scintillator.

FIG. 3 is a block diagram showing a neutron measuring apparatus and a method for neutron measurement according to another embodiment of the present invention. In the drawing, reference numeral 8 means a rod-type neutron emission transmitting portion in which a neutron converter such as Li-6 is added to a solid scintillator. Other component parts are identical with those shown in FIG. 2.

When the neutron is incident on the neutron emission transmitting portion 8, charged particles are generated by the neutron converter 7 added to the scintillator 1 in the neutron emission transmitting portion 8. Then, the scintillator 1 emits a light at a position on which the neutron is incident. The scintillation generated in the scintillator 1 can reach, at different time points, two photoelectric converters 2 connected to both ends of the emission transmitting portion 1. Signals outputted from the photoelectric converters 2 are processed as in the second embodiment. Further, by processing the signals according to a time-of-flight method, it is possible to find a neutron distribution of the neutron incident on the neutron emission transmitting portion 8.

As set forth above, there is provided the hybrid neutron measuring apparatus in which the neutron converter 7 is added to the scintillator 1. As a result, it is possible to increase a luminous efficiency of the scintillator 1.

Further, the neutron converter 7 added to the scintillator 1 generates the charged particles. As a result, it is possible to accurately specify an incidence position of the neutron, and provide finer resolution of an incidence distribution of the neutron.

Embodiment 4

Figure 4:
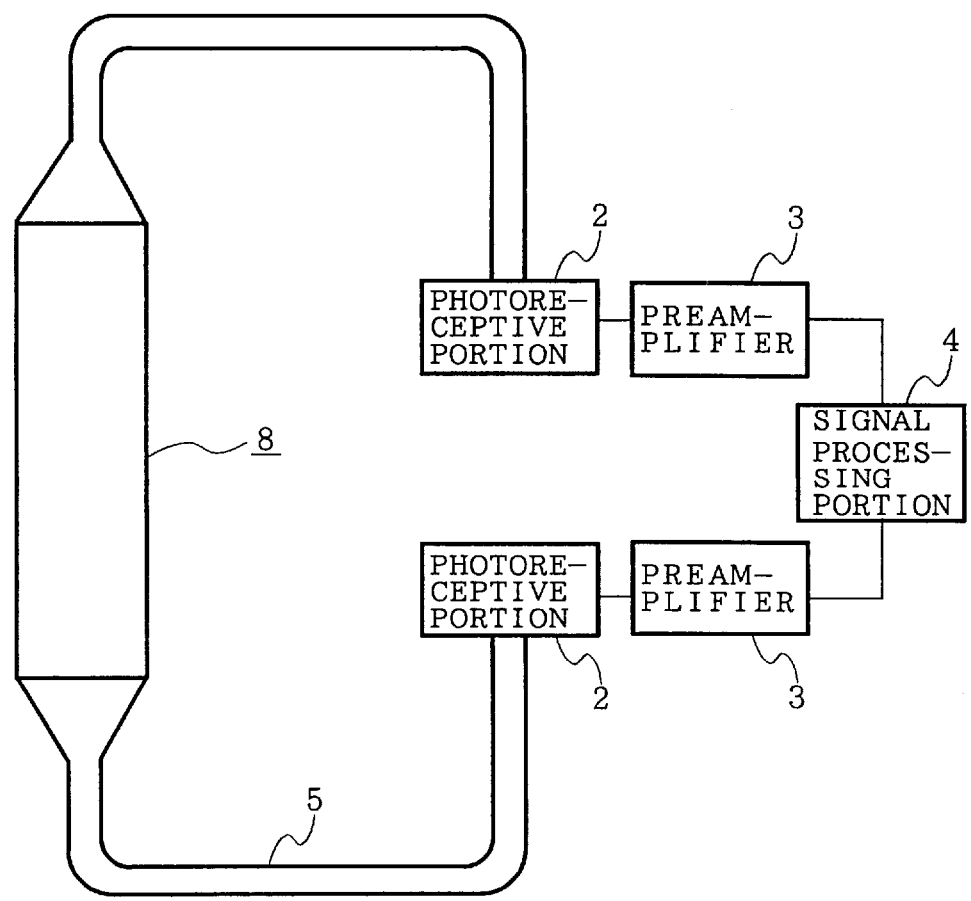
FIG. 4 is an explanatory view showing a structure of a neutron measuring apparatus according to one embodiment of the present invention, in which scintillation is transmitted through optical transmission lines.

FIG. 4 is a block diagram showing a neutron measuring apparatus and a method for neutron measurement according to another embodiment of the present invention. In the drawing, reference numeral 5 means optical transmission lines connected to both ends of a neutron emission transmitting portion 8 so as to transmit scintillation. Other component parts are identical with those in the third embodiment shown in FIG. 3. In this case, the optical transmission line 5 may include an optical fiber or the like.

When neutron is incident on the neutron emission transmitting portion 8, charged particles are generated by a neutron converter 7 added to a scintillator 1. Then, the scintillator 1 emits a light at an incidence position of the neutron. The scintillation generated in the neutron emission transmitting portion 8 is transmitted to two photoelectric converters 2 through the optical transmission lines 5 connected to both the ends of the neutron emission transmitting portion 8. Signals outputted from the photoelectric converters 2 are processed as in the second embodiment. Further, by processing the signals according to a time-of-flight method, it is possible to find a neutron distribution of the neutron incident on the neutron emission transmitting portion 8.

In addition, the neutron emission transmitting portion 8 is isolated from the photoelectric converters 2 through the optical transmission lines 5. As a result, it is possible to reduce electromagnetic noise having an effect on the photoelectric converter 2.

Embodiment 5

Figure 5:
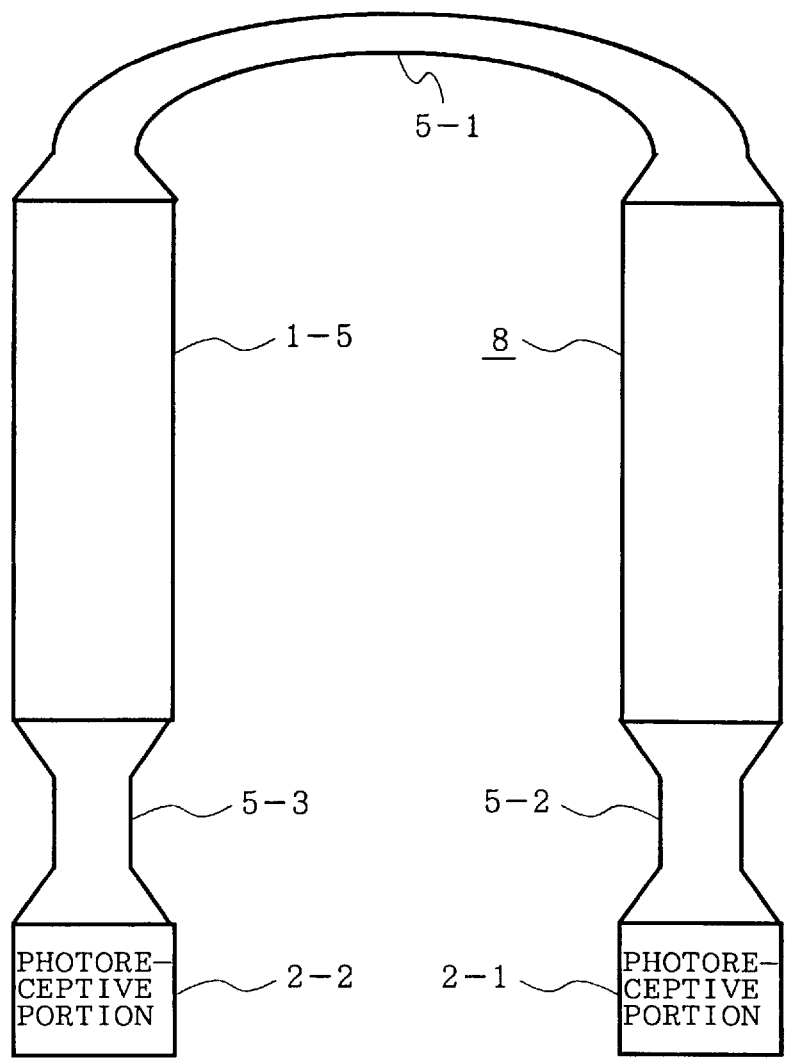
FIG. 5 is an explanatory view showing a structure of a neutron measuring apparatus according to one embodiment of the present invention, in which emission transmitting portions are connected to measure charged particles.

FIG. 5 is a block diagram showing a neutron measuring apparatus and a method for neutron measurement according to another embodiment of the present invention. In the drawing, reference numeral 1-5 means an emission transmitting portion identical with that described in the first embodiment, 5-1 is an optical transmission line for connecting the emission transmitting portion 1-5 and a neutron emission transmitting portion 8, 5-2 and 5-3 are optical transmission lines used to introduce scintillation from ends of the neutron emission transmitting portion 8 and the emission transmitting portion 1-5 to two photoelectric converters 2-1 and 2-2, and 2-1 and 2-2 are the photoelectric converters which are respectively connected to one ends of the optical transmission lines 5-2 and 5-3. That is, the neutron measuring apparatus in the embodiment includes a gamma-ray measuring portion 1-5 connected in series to the neutron emission transmitting portion 8.

The neutron emission transmitting portion 8 and the gamma-ray measuring portion 1-5 are disposed such that the same neutron distribution can be obtained in their axial directions. For example, axes of the neutron emission transmitting portion 8 and the emission transmitting portion 1-5 are arranged parallel to a core axis of a nuclear reactor.

When the neutron is incident on the neutron measuring apparatus having the above arrangement and structure, the neutron emission transmitting portion 8 emits a light to cause scintillation. In this case, a high gamma ray level can be observed at a position having high neutron density. If the gamma rays are incident on the apparatus, the neutron emission transmitting portion 8 and the emission transmitting portion 1-5 concurrently emit lights.

The scintillation generated in the neutron emission transmitting portion 8 is transmitted to the two photoelectric converters 2-1 and 2-2 through the optical transmission lines 5-1 and 5-2 connected to both the ends of the neutron emission transmitting portion 8. On the other hand, the scintillation generated in the emission transmitting portion 1-5 is transmitted to the two photoelectric converters 2 through the optical transmission lines 5-1 and 5-3 connected to both the ends of the emission transmitting portion 1-5.

The scintillation generated in the neutron emission transmitting portion 8 and the emission transmitting portion 1-5 can reach the two photoelectric converters 2-1 and 2-2 at different time points. Signals outputted from the photoelectric converters 2-1 and 2-2 are processed in a signal processing circuit according to a time-of-flight method.

Subsequently, measurement is made for one dose rate distribution including distributions of the neutron and the gamma rays incident on the neutron emission transmitting portion 8, and for another dose rate distribution including a distribution of the gamma rays incident on the emission transmitting portion 1-5. A signal processing portion 4 subtracts the dose rate distribution in the emission transmitting portion 1-5 from the dose rate distribution in the neutron emission transmitting portion 8. It is thereby possible to remove an effect of the gamma rays incident on the neutron emission transmitting portion 8. Thus, it is possible to measure the neutron distribution in the neutron emission transmitting portion 8 with high accuracy.

The dose rate distribution as used herein means a distribution per unit time, and is substantially identical with an incidence distribution of the neutron or the ionizing radiation measured in the first to fifth embodiments.

Further, the photoelectric converters 2-1 and 2-2 can be disposed in the same direction. As a result, it is possible to provide a higher degree of freedom for arrangement of signal conductors to fetch signals from the photoelectric converters 2-1 and 2-2.

Embodiment 6

Figure 6:
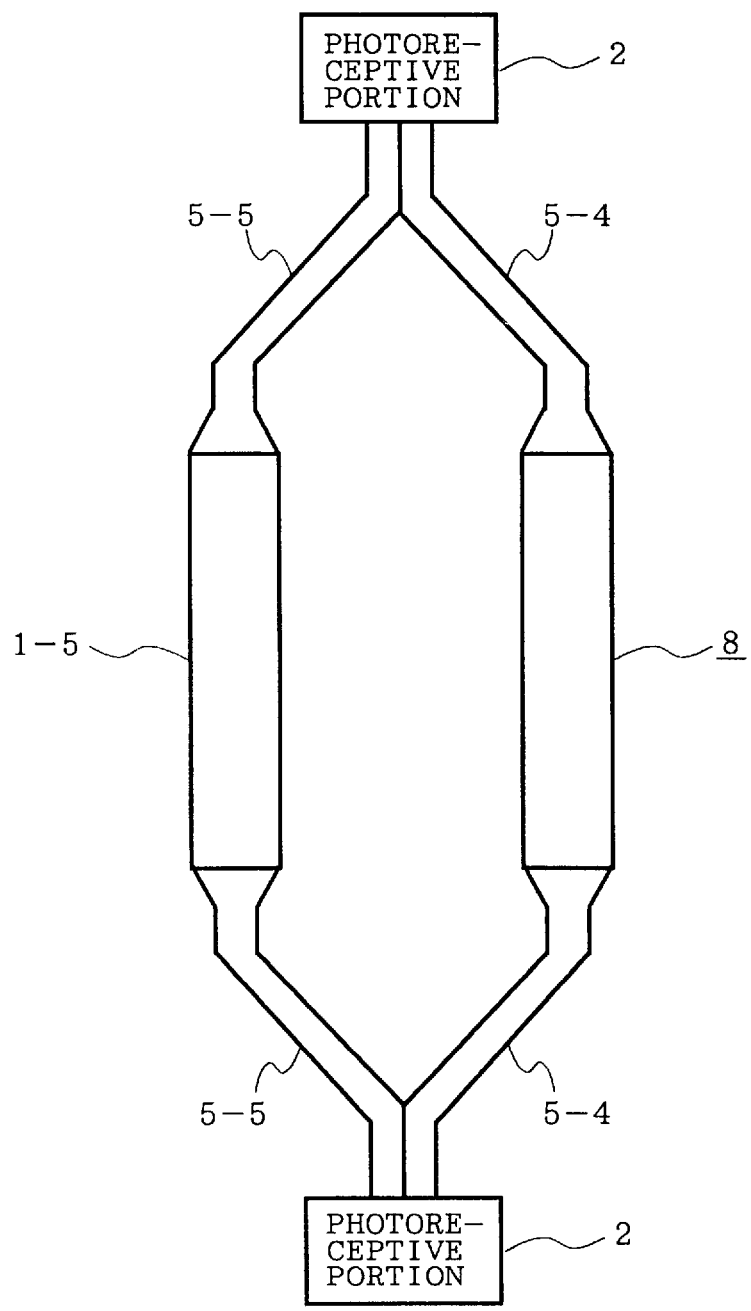
FIG. 6 is an explanatory view showing a structure of a neutron measuring apparatus according to one embodiment of the present invention, in which emission transmitting portions are connected in parallel to measure charged particles.

FIG. 6 is a block diagram showing a neutron measuring apparatus and a method for neutron measurement according to another embodiment of the present invention. In the drawing, reference numerals 5-4 and 5-5 mean transmission lines for connecting a neutron emission transmitting portion 8 and an emission transmitting portion 1-5 to photoelectric converters 2. The neutron emission transmitting portion 8 and the emission transmitting portion 1-5 are adjacently disposed and connected in parallel with each other through the optical transmission lines 5-4 and 5-5. Other component parts are identical with those in the fifth embodiment shown in FIG. 5. That is, the neutron measuring apparatus in the embodiment includes the gamma-ray measuring portion 1-5 connected in parallel with the neutron emission transmitting portion 8.

The neutron emission transmitting portion 8 and the emission transmitting portion 1-5 are disposed such that the same neutron distribution can be obtained in their axial directions. For example, axes of the neutron emission transmitting portion 8 and the emission transmitting portion 1-5 are arranged parallel to a core axis of a cylindrical nuclear reactor.

When the neutron is incident on the neutron measuring apparatus, the neutron emission transmitting portion 8 emits a light to cause scintillation. In this case, a high gamma ray level can be observed at a position having high neutron density. If the gamma rays are incident on the apparatus, the neutron emission transmitting portion 8 and the emission transmitting portion 1-5 concurrently emit lights.

The scintillation generated in the neutron emission transmitting portion 8 is transmitted to the two photoelectric converters 2 through the optical transmission line 5-4 connected to both ends of the neutron emission transmitting portion 8. On the other hand, the scintillation generated in the emission transmitting portion 1-5 is transmitted to the two photoelectric converters 2 through the optical transmission line 5-4 connected to both ends of the emission transmitting portion 1-5.

The scintillation generated in the neutron emission transmitting portion 8 and the emission transmitting portion 1-5 can reach the two photoelectric converters 2 at different time points. Signals outputted from the photoelectric converters 2 are processed in a signal processing circuit 4 according to a time-of-flight method.

Subsequently, measurement is made for one dose rate distribution including distributions of the neutron and the gamma rays incident on the neutron emission transmitting portion 8, and for another dose rate distribution including a distribution of the gamma rays incident on the emission transmitting portion 1-5. A signal processing portion 4 subtracts the dose rate distribution in the emission transmitting portion 1-5 from the dose rate distribution in the neutron emission transmitting portion 8. It is thereby possible to remove an effect of the gamma rays incident on the neutron emission transmitting portion 8. Thus, it is possible to measure the neutron distribution in the neutron emission transmitting portion 8 with high accuracy.

In the fifth and sixth embodiments, a description has been given of the following case. That is, the neutron emission transmitting portion 8 and the emission transmitting portion 1-5 are disposed such that the same neutron distribution can be obtained in their axial directions. For example, the axes of the neutron emission transmitting portion 8 and the emission transmitting portion 1-5 are arranged parallel to the core axis of the cylindrical nuclear reactor. In this case, a diameter of the nuclear reactor may sufficiently be reduced in the axial direction of the neutron emission transmitting portion 8 and the emission transmitting portion 1-5, and the neutron emission transmitting portion 8 and the emission transmitting portion 1-5 may closely be disposed. It is thereby possible to remove an effect of the gamma rays so as to measure the neutron distribution of the neutron incident on the neutron emission transmitting portion 8 with high accuracy.

The nuclear reactor of a nuclear power plant includes the neutron 9 and ionizing radiation such as, mainly, the gamma rays. In the above discussion, no description has been given of a method of discriminating the ionizing radiation incident on the scintillator 1, i.e., discriminating charged particles generated by a neutron converter 7 from existing charged particles in the nuclear reactor. This is because it is difficult to provide, for example, a discriminating circuit used to discriminate scintillation generated by the neutron 9 from scintillation generated by the gamma rays with high accuracy. That is, though the neutron can be discriminated from the gamma rays to some extent depending upon a difference in pulse waveform, many neutrons and gamma rays have substantially the same pulse waveform. As a result, it is impossible to discriminate the neutron from the gamma rays with high accuracy.

Embodiment 7

Figure 7:
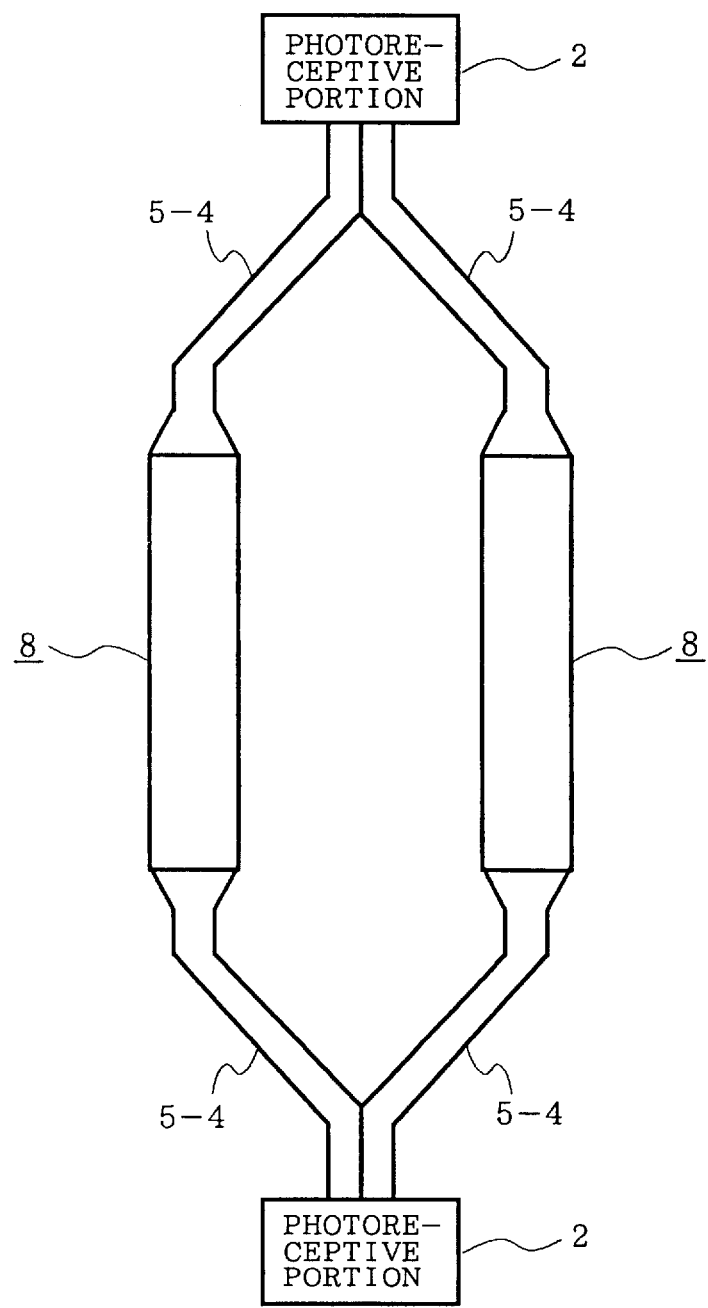
FIG. 7 is an explanatory view showing a structure of a neutron measuring apparatus according to one embodiment of the present invention, in which two neutron emission transmitting portions are connected in parallel.

FIG. 7 is a block diagram showing a neutron measuring apparatus and a method for neutron measurement according to another embodiment of the present invention. As shown in FIG. 7, the neutron measuring apparatus in the embodiment includes two neutron emission transmitting portions 8 which are connected in parallel with each other. Other component parts are identical with those in the sixth embodiment shown in FIG. 6.

The neutron emission transmitting portions 8 are disposed such that the same neutron distribution can be obtained in their axial directions. For example, axes of the neutron emission transmitting portions 8 are arranged in parallel to an axis of a cylindrical nuclear reactor.

When the neutron is incident on the neutron emission transmitting portions 8, the neutron emission transmitting portion 8 emits a light to cause scintillation. The scintillation generated in the neutron emission transmitting portion 8 is transmitted to two photoelectric converters 2 through optical transmission lines 5-4 and 5-5 connected to both ends of the neutron emission transmitting portions 8. The scintillation generated in the neutron emission transmitting portions 8 can reach the two photoelectric converters 2 at different time points, thereby generating pulse signals. The pulse signal is amplified by a preamplifier, and thereafter is processed in a signal processing circuit 4 according to a time-of-flight method.

That is, the two neutron emission transmitting portions 8 can measure neutron distributions of neutrons incident on the neutron emission transmitting portions 8. Further, the two neutron emission transmitting portions 8 are connected in parallel with each other, and the same incidence distribution of neutron can be obtained in axial directions of the two neutron emission transmitting portions 8. Consequently, even when one of the neutron emission transmitting portions 8 fails, the other can be used for measurement.

Embodiment 8

FIG. 8 is a partially broken view showing a neutron measuring apparatus according to another embodiment of the present invention. In the drawing, reference numeral 8 means a neutron emission transmitting portion in which a neutron converter such as Li-6 is added to a solid scintillator, 5 is an optical transmission line passing through the neutron emission transmitting portion 8; to which a wavelength shifter is added, and 2 is photoelectric converters connected to both ends of the optical transmission line 5. The neutron measuring apparatus in the embodiment is formed without an optical connecting portion.

When neutron is incident on the neutron emission transmitting portion 8, charged particles are generated by the neutron converter added to the scintillator, resulting in emission of the scintillator 1. The scintillation generated in the scintillator is incident on the optical transmission line 5 so as to interact with the wavelength shifter in the optical transmission line 5. Thus, light having a wavelength different from that of the incident scintillation is transmitted to both the ends of the optical transmission line 5. Consequently, the light is transmitted to reach the two photoelectric converters 2 connected to both the ends of the optical transmission line 5 at different time points, thereby generating pulse signals.

As stated above, the optical transmission line 5 to which a wavelength converting material is added has no connecting portion (such as connector). Thus, it is possible to reduce attenuation of the light, and realize long-distance transmission of the light.

Embodiment 9

Figure 9:
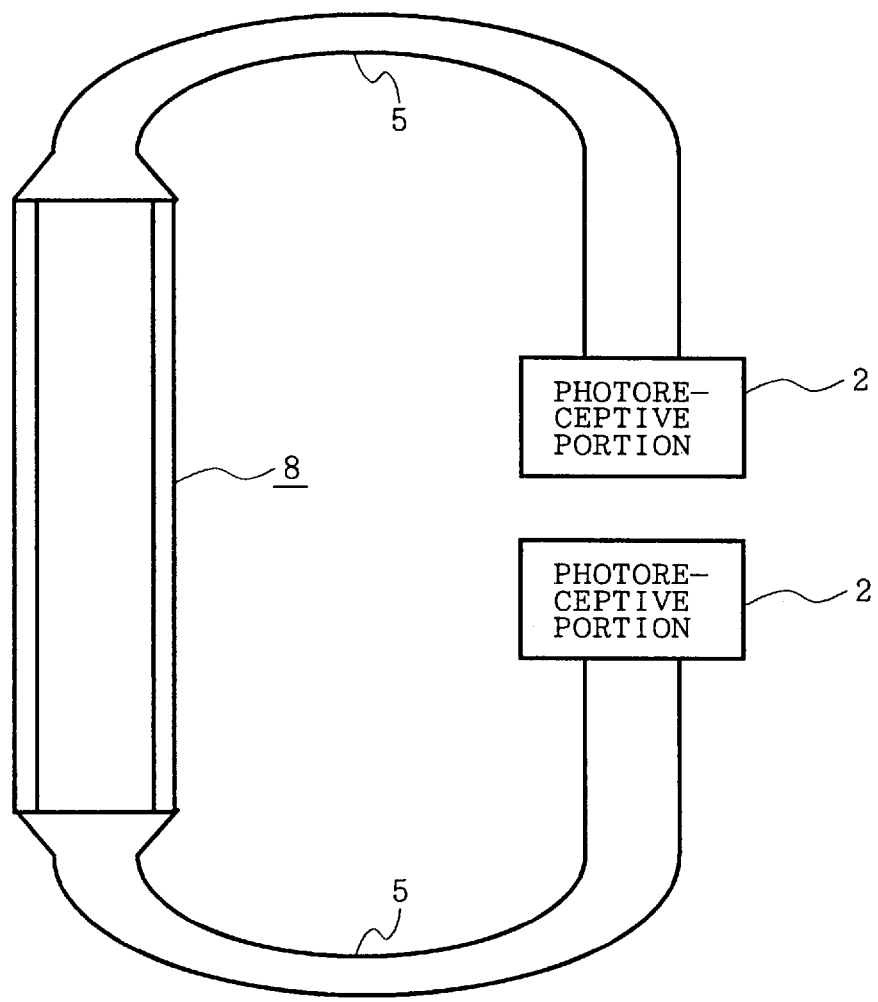
FIG. 9 is an explanatory view showing a structure of a neutron measuring apparatus according to one embodiment of the present invention, employing a gas scintillator.
Figure 10:
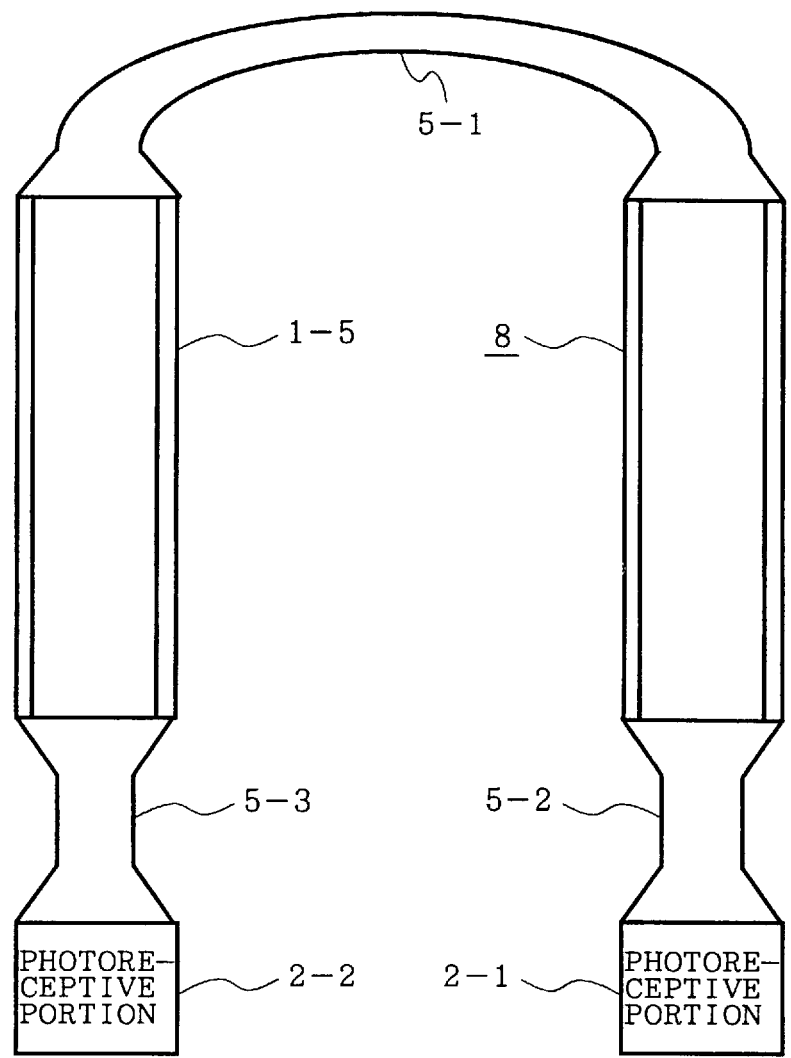
FIG. 10 is an explanatory view showing a structure of a neutron measuring apparatus according to one embodiment of the present invention, employing a gas scintillator.
Figure 11:
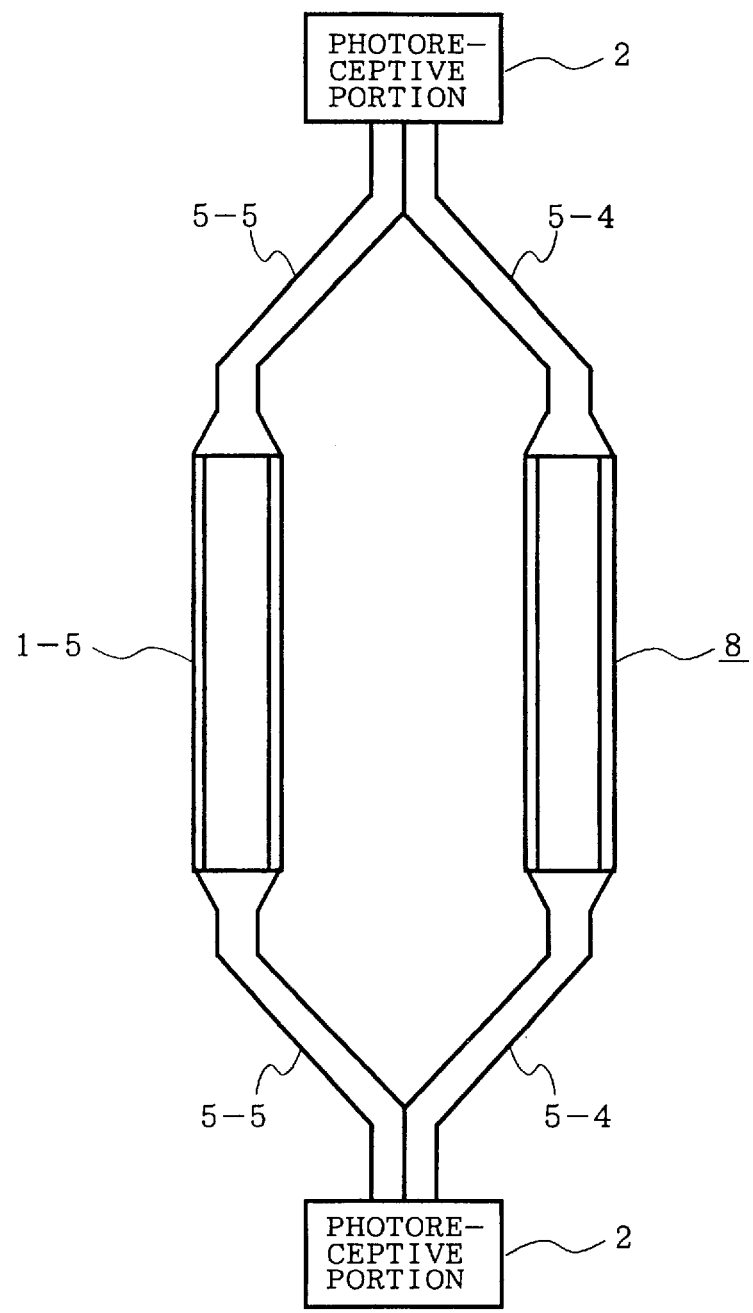
FIG. 11 is an explanatory view showing a structure of a neutron measuring apparatus according to one embodiment of the present invention, employing a gas scintillator.

FIGS. 9 to 11 are block diagrams showing neutron measuring apparatus according to other embodiments of the present invention. The neutron measuring apparatus in the embodiments include a gas scintillator. In the embodiment shown in FIG. 9, the neutron measuring apparatus is provided with a gas scintillator sealed in a container 6 instead of the solid scintillator 1 forming the neutron emission transmitting portion 8 which is used in the neutron measuring apparatus in the fourth embodiment. In such a structure, it is also possible to similarly measure neutron.

Embodiment 10

In the embodiment shown in FIG. 10, a neutron measuring apparatus is provided with a gas scintillator sealed in a container 6 instead of the solid scintillator 1 forming the neutron emission transmitting portion 8 and the emission transmitting portion 1-5 which are connected in series through the optical transmission line, used in the neutron measuring apparatus in the fifth embodiment. In such a structure, it is also possible to similarly measure neutron.

Embodiment 11

In the embodiment shown in FIG. 11, a neutron measuring apparatus is provided with a gas scintillator sealed in a container 6 instead of the solid scintillator 1 forming the neutron emission transmitting portion 8 and the emission transmitting portion 1-5 which are connected in parallel through the optical transmission line, used in the neutron measuring apparatus in the sixth embodiment. In such a structure, it is also possible to similarly measure neutron.

The neutron measuring apparatus in the ninth to eleventh embodiments employ the gas scintillator so that a life of the scintillator 1 can be increased. Further, it is possible to replace the gas scintillator to be filled, and facilitate a sensitivity calibration test, maintenance, and so forth.

A description has been given of a case where the scintillator sealed in the container 6 is the gas. However, it must be noted that liquid type scintillator may be used to similarly measure the neutron, resulting in the same effect as that of the gas scintillator.

Embodiment 12

FIG. 12 is a block diagram showing a neutron measuring apparatus according to another embodiment of the present invention. In the drawing, reference numeral 8 means a ring-type neutron emission transmitting portion in which a neutron converter such as Li-6 is added to a solid scintillator, and 2 is a photoelectric converter to receive scintillation so as to convert the light into electric information. Other component parts are identical with those in the third embodiment. The neutron measuring apparatus in the embodiment is provided with a single photoreceptive portion.

When neutron is incident on the neutron emission transmitting portion 8, charged particles are generated by the neutron converter 7 added to the scintillator 1. The scintillation reaches the photoreceptive portion 2 connected to both ends of the neutron emission transmitting portion 8 at different time points. The photoreceptive portion 2 generates and outputs a signal in response to the reaching light. The signal is amplified by a preamplifier 3, and is inputted into a signal processing portion 4.

In this case, the scintillation can reach the photoreceptive portions 2 through two different transmitting paths a and b. Since the transmitting paths a and b are different in length, a time difference is caused in times required to reach the photoreceptive portions 2. Thus, the signal processing portion 4 detects a time difference in input times of the inputted signals. Further, it is possible to specify the lengths of the transmitting paths a and b depending upon the time difference. That is, the signal processing portion 4 can determine an incidence position of the incident neutron. Further, it is possible to find a neutron distribution of the neutron incident on the neutron emission transmitting portion 8. In addition, the structure requires only one photoelectric converter 2 so that the structure can be simplified.

A description has been given of a case of the ring type neutron emission transmitting portion 8. However, it must be noted that the neutron emission transmitting portion 8 may be provided in a rod-type form as in the fourth embodiment. In this case, the optical transmission lines 5 may be connected to both ends of the neutron emission transmitting portion 8, and the optical transmission lines 5 may be connected to the one photoelectric converter 2.

Further, a description has been given of a case where the scintillation transmitted to the photoelectric converter 2 are received at opposite surfaces of the photoelectric converter 2. However, it is to be noted that the scintillation may be received at the same surface, and may be received at the same position on the same surface by using the optical transmission line 5.

In this case, it is possible to reduce an area occupied by, for example, the photoelectric converter 2 and cables connected thereto.

Embodiment 13

Figure 13:
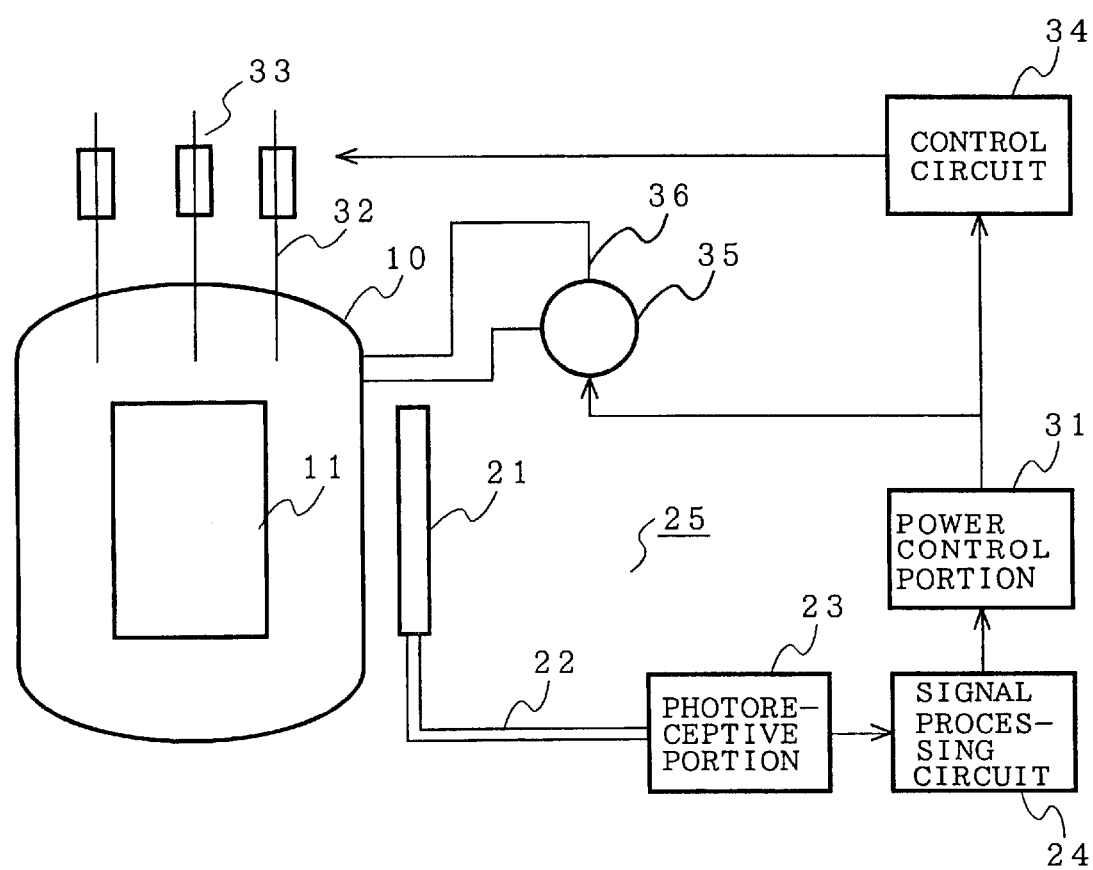
FIG. 13 is an explanatory view showing a structure of a nuclear power plant according to one embodiment of the present invention, in which a neutron measuring apparatus is mounted external to a nuclear reactor.
Figure 15:
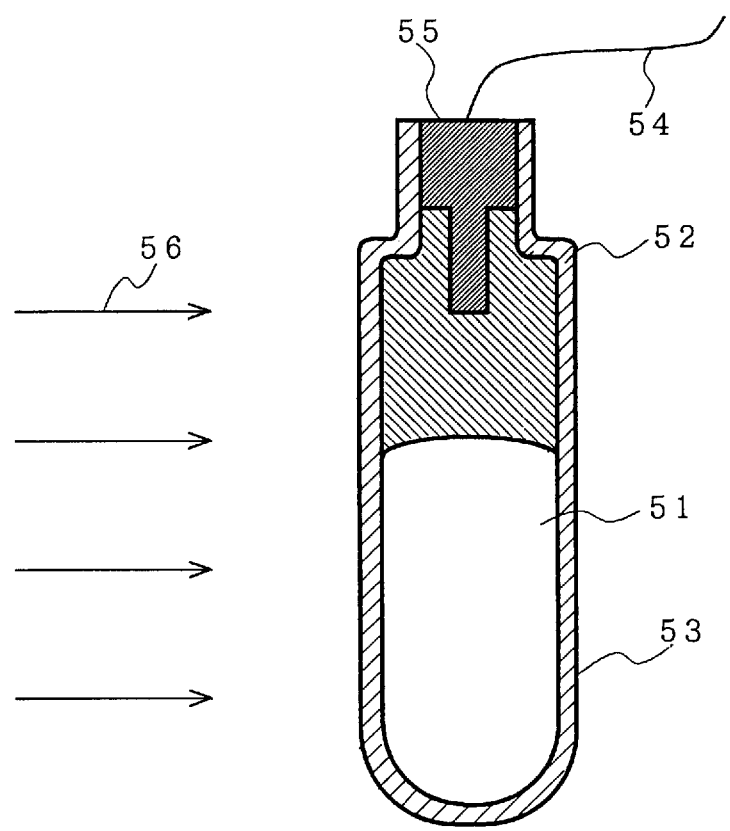
FIG. 15 is a diagram showing a structure of a conventional neutron detector.

FIG. 13 is a block diagram showing a nuclear power plant with a neutron measuring apparatus mounted external to a nuclear reactor, according to one embodiment of the present invention. In the drawing, reference numeral 10 means a reactor vessel of the nuclear reactor, 11 is a reactor core (fuel portion) having a cylindrical form, 21 is a scintillator having a neutron converter, 22 is a plurality of optical fibers to transmit light signals from the scintillator 21 having the neutron converter, 23 is a photoreceptor to receive light from the optical fibers 22, and 24 is a signal processing circuit to measure neutron by the signal obtained by the photoreceptor. Further, reference numeral 25 means the neutron measuring apparatus including the scintillator 21 having the neutron converter, the optical fibers 22, the photoreceptor 23, and the signal processing circuit 24. FIG. 13 shows a structure of the nuclear power plant.

Further, reference numeral 31 means a power control portion to control power of the nuclear reactor depending upon the result of measurement in the neutron measuring apparatus 25, 32 is control rods which are made of material to absorb the neutron and can be moved by drive units 33 in an axial direction of the reactor core, 34 is a control circuit to control the drive units 33, 35 is a pump to circulate a coolant in the reactor vessel 10, and 36 is a duct to introduce the coolant into the reactor vessel 10.

Next, a description will be given of a method for power control of the nuclear power plant. When it is decided by the power control portion 31 that power of the nuclear reactor is too high, the control rods 32 are inserted into the reactor core to reduce the power of the nuclear reactor. Alternatively, a flow rate of the coolant may be reduced by using the pump 35 so as to reduce the power of the nuclear reactor. Otherwise, when it is decided that the power of the nuclear reactor is too low, an operation reverse to the above operation may be carried out.

In the embodiment, the neutron measuring apparatus 25 can accurately measure a neutron flux distribution in the axial direction of the reactor core 11. Therefore, even when the neutron flux distribution is deviated from a desired distribution, it is possible to simply obtain a desired neutron distribution by appropriately controlling the control rods 33 and the pump 35. That is, it is possible to elaborately control the power of the nuclear power plant.

Embodiment 14

FIG. 14 is a diagram showing a nuclear reactor with a scintillator 21 having neutron converter disposed in a reactor vessel 11. Component parts are identical with those in the nuclear power plant shown in FIG. 13.

In this case, the scintillator 21 having the neutron converter and optical fibers 22 are disposed in the reactor vessel 11. Therefore, it is possible to elaborately detect a neutron flux.

In the reactor vessel 11, neutron having tremendous kinetic energy is incident on the scintillator 21 having the neutron converter, and the optical fibers 22. The scintillator 21 having the neutron converter, and the optical fibers 22 have a short lifetime. Hence, it is more desirable to dispose fewer neutron measuring apparatus 25 in the reactor vessel 11. Since a neutron distribution can be measured by the one neutron measuring apparatus 25, it is possible to reduce the labor of replacing the neutron measuring apparatus 25.

Figure 16:
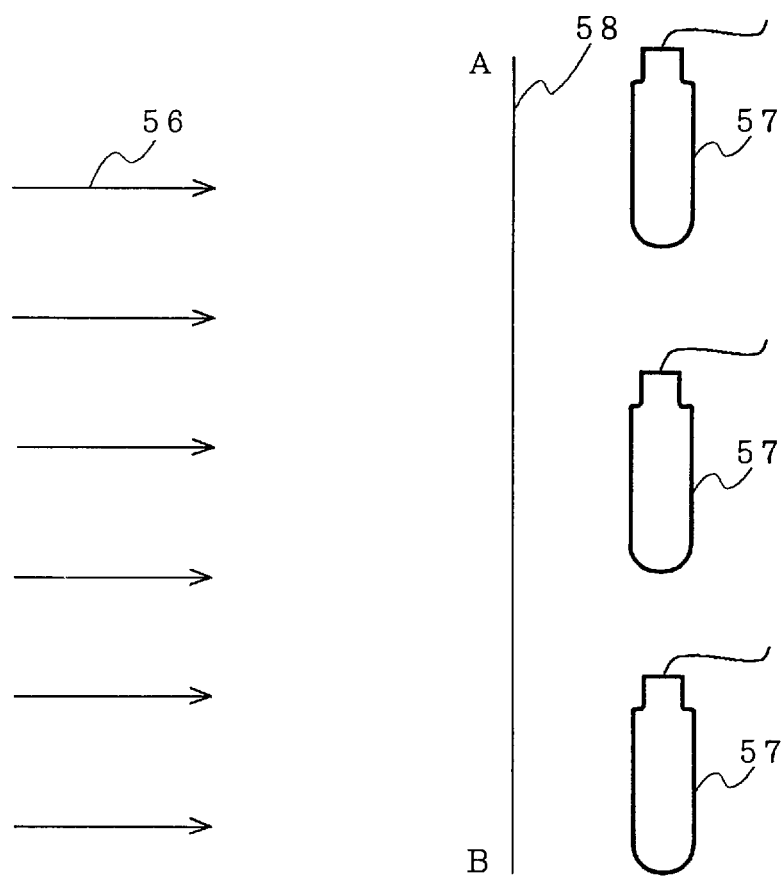
FIG. 16 is a diagram showing an arrangement of conventional neutron measuring apparatus.

As set forth above, in the nuclear power plant in the embodiment, it is possible to reduce the number of neutron measuring apparatus 25 as compared with a conventional method of measuring the neutron distribution as illustrated in FIG. 16. Consequently, it is possible to reduce the number of component parts of the neutron measuring apparatus 25, i.e., reduce the number of neutron emission transmitting portion 21, the optical fibers 22, and so forth, resulting in reduction of maintenance or the like. This is advantageous under a harsh circumstance like the vicinity of the nuclear reactor.

Figure 17:
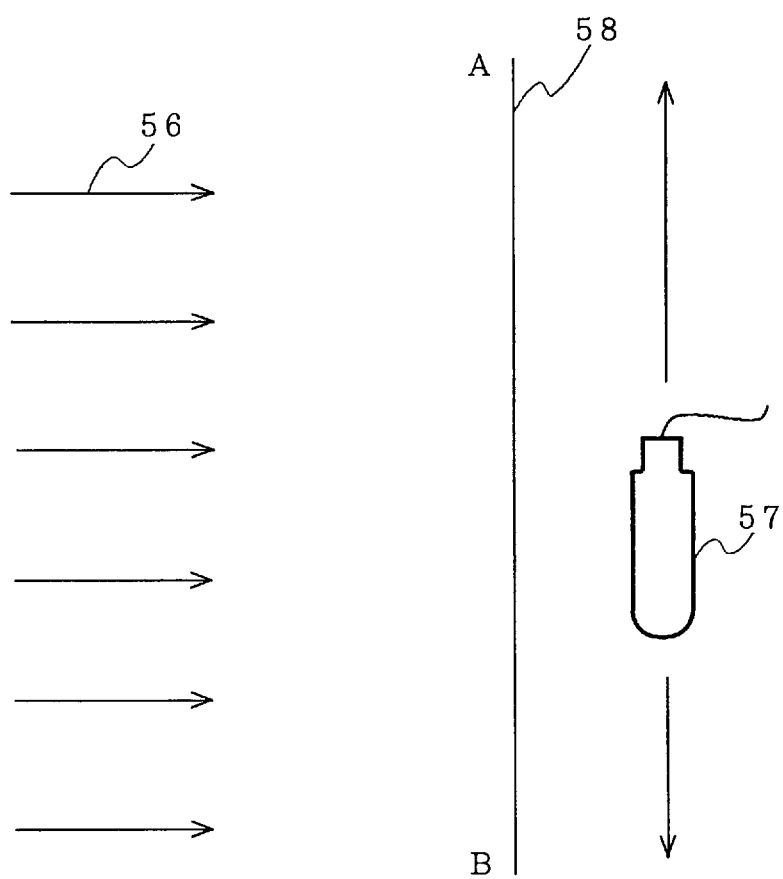
FIG. 17 is a diagram showing an arrangement of a conventional neutron measuring apparatus.

As compared with a conventional method for neutron measurement as illustrated in FIG. 17, a wider area can be measured within a predetermined period because it is unnecessary to move the neutron emission transmitting portion. Thus, the neutron distribution can be measured in a short time. Further, since it is unnecessary to move, for example, the neutron emission transmitting portion 21, and the optical fibers 22, no moving mechanism is required. Further, failure due to, for example, disconnection of the optical fiber 22 can be reduced.

As stated above, according to the present invention, it is possible to provide the following effects.

According to the present invention, there is provided the particle measuring apparatus including the emission transmitting mechanism to emit a light in response to incidence of the ionizing radiation and transmit the light, the photoreceptive mechanism to receive the light through the plurality of different transmitting paths, and the signal processing mechanism to process the output signal from the photoreceptive mechanism. As a result, depending upon the quantity of ionizing radiation reaching the photoreceptive mechanism, it is possible to measure the quantity of ionizing radiation incident on the emission transmitting mechanism and the position of the emission transmitting mechanism, on which the ionizing radiation is incident.

Further, since the ionizing radiation is the gamma rays, it is possible to measure a charged particle distribution in an area in the vicinity of the nuclear reactor, in which the gamma rays are generated.

Further, there is provided the particle measuring apparatus including the neutron/charged particle converting mechanism to generate the charged particles in response to incidence of the neutron, and the emission transmitting mechanism to emit a light in response to incidence of the charged particles and transmit the light. The emission transmitting mechanism includes the neutron emission transmitting mechanism on which the charged particles generated from the neutron/charged particle converting mechanism can be incident, the photoreceptive mechanism to receive the light through the plurality of different transmitting paths, and the signal processing mechanism to process the output signal from the photoreceptive mechanism. As a result, depending upon the number of charged particles reaching the photoreceptive mechanism, it is possible to measure the number of charged particles incident on the emission transmitting mechanism, and the position of the emission transmitting mechanism, on which the charged particles are incident. That is, it is possible to measure the number of neutrons incident on the neutron emission transmitting mechanism, and the position of the charged particle emission transmitting mechanism, on which the neutrons are incident.

Further, the neutron/charged particle converting mechanism is provided in a linear form so as to intersect the neutron. The photoreceptive mechanisms are connected to both the ends of the neutron/charged particle converting mechanism. It is thereby possible to measure a distribution of the neutron which is incident in the axial direction of the neutron/charged particle converting mechanism.

Further, the emission transmitting mechanism is the solid scintillator, and the neutron/charged particle converting mechanism is the granular neutron converter. The neutron emission transmitting mechanism is formed by adding the neutron converter to the scintillator. As a result, it is possible to accurately detect the incidence position of the neutron incident on the neutron emission transmitting mechanism, and provide finer resolution in neutron measurement.

Further, there are provided the photoreceptive mechanisms whose number is identical with that of the transmitting paths. As a result, the one-to-one correspondence is established between the transmitting paths and the photoreceptive mechanisms, resulting in finer resolution in light measurement.

Further, there are provided the plurality of neutron emission transmitting mechanisms. As a result, even when one of the neutron emission transmitting mechanisms fails, the neutron can be measured.

Further, the transmitting path includes the emission transmitting mechanism, and the optical transmission line for connecting the emission transmitting mechanism and the photoreceptive mechanism. As a result, it is possible to reduce the electromagnetic noise which is generated in the photoreceptive element due to the neutron or the charged particle.

Further, other emission transmitting mechanisms are mounted through the optical transmission line so as to emit a light in response to incidence of the ionizing radiation and transmit the light, and both the emission transmitting mechanisms are optically connected in series. As a result, it is possible to cancel an effect of the ionizing radiation incident on the neutron emission transmitting mechanism. Further, it is possible to measure only the neutron incident on the neutron emission transmitting mechanism, and reduce a restriction on arrangement of the photoreceptive mechanism or the transmission line.

Further, another emission transmitting mechanism is mounted to emit a light in response to incidence of the ionizing radiation and transmit the light. As a result, it is possible to cancel an effect of the ionizing radiation incident on the neutron emission transmitting mechanism, and measure only the neutron incident on the neutron emission transmitting mechanism.

Further, there is provided the optical transmission line for interconnecting the photoreceptive mechanisms, to which the wavelength converting material is added. The neutron emission transmitting mechanism is wound at the optical transmission line. As a result, it is possible to realize a long-distance transmission of light without decreasing light-intensity.

Further, the signal processing mechanism includes the time-to-pulse height converting circuit to receive as input an output signal from the photoreceptive mechanism, and the multi-channel analyzer to receive as input a pulse signal from the time-to-pulse height converting circuit. As a result, it is possible to measure the incidence distribution and the quantity of incidence of the charged particle incident on the optical transmitting mechanism by using a simple circuit.

Further, in the nuclear power plant to generate the neutron according to nuclear fission or nuclear fusion in the nuclear reactor, the particle measuring apparatus includes the neutron emission transmitting mechanism having the neutron/charged particle converting portion to generate the charged particle in response to incidence of the neutron, and the emission transmitting portion to emit a light in response to incidence of the charged particle and transmit the light, and the charged particle generated from the neutron/charged particle converting portion can be incident on the emission transmitting portion. Further, the particle measuring apparatus includes the photoreceptive mechanism to receive the light travelling through the plurality of different transmitting paths. The particle measuring apparatus measures the particle depending upon the difference in times required for the light travelling through the different transmitting paths to reach the photoreceptive mechanism, and upon the quantity of light. In addition, the power control mechanism is provided to control the power of the nuclear reactor depending upon the result of measurement in the particle measuring apparatus. As a result, it is possible to provide finer resolution in the neutron distribution measurement, accurately measure the neutron distribution, accurately control the power of the nuclear reactor, and reduce the number of particle measuring apparatus disposed in the nuclear reactor.

Further, the particle measuring apparatus is disposed along the core axis of the nuclear reactor. As a result, it is possible to carry out the neutron distribution measurement at a position having the largest neutron distribution in the nuclear reactor with high measurement accuracy.

Further, the particle measuring apparatus is disposed in the nuclear reactor. As a result, it is possible to measure the neutron distribution with high accuracy, reduce the number of particle measuring apparatus disposed in the nuclear reactor, and reduce a time required to measure the neutron in the nuclear reactor.

Further, the method for particle measurement includes the steps of emitting a light in response to the ionizing radiation incident on the emission transmitting portion and transmitting the light, receiving by the photoreceptive mechanism the light travelling through the plurality of different transmitting paths, and measuring the ionizing radiation depending upon the difference in times required for the light travelling through the different transmitting paths to reach the photoreceptive mechanism, and upon the quantity of light. As a result, it is possible to measure the quantity of ionizing radiation incident on the emission transmitting portion depending upon the quantity of ionizing radiation reaching the photoreceptive mechanism, and measuring the position of the emission transmitting portion, on which the ionizing radiation is incident, depending upon the difference in times required to reach the photoreceptive mechanism.

While preferred embodiments of the invention have been described using specific terms, such description is for illustrative purposes only, and it is to be understood that changes and variations may be made without departing from the spirit or scope of the following claims.

What is claimed is:

1. A particle measuring apparatus comprising:

neutron/charged particle converting means for generating charged particles in response to the incidence of neutrons and ionizing radiation, said neutron/charged particle converting means being provided in a linear form so as to intersect the emission path of said neutrons and ionizing radiation;

emission transmitting means for emitting light in response to the incidence of ionizing radiation or charged particles, and transmitting the light;

photoreceptive means, connected to both ends of said neutron/charged particle converting means, for receiving the light transmitted by said emission transmitting means through at least two different transmitting paths and producing output signals in response to received light in each transmitting path; and signal processing means for processing the output signals from the photoreceptive means, detecting a time difference between said output signals to determine an incidence position of said neutrons and ionizing radiation, and counting a quantity of said output signals received from said photoreceptive means.

2. A particle measuring apparatus according to claim 1, wherein the ionizing radiation is gamma rays.

3. A particle measuring apparatus according to claim 1, wherein the emission transmitting means is a solid scintillator, the neutron/charged particle converting means being a granular neutron converter, and the neutron converter being added to the scintillator.

4. A particle measuring apparatus according to claim 1, wherein a plurality of combinations of the emission transmitting means and the neutron/charged particle converting means are provided.

5. A particle measuring apparatus according to claim 1, wherein a plurality of the photoreceptive means whose number is identical with that of the transmitting paths are provided.

6. A particle measuring apparatus according to claim 1, wherein the transmitting path includes the emission transmitting means, and the optical transmission line for connecting the emission transmitting means and the photoreceptive means.

7. A particle measuring apparatus according to claim 6, further comprising second emission transmitting means for emitting a light in response to incidence of the ionizing radiation, and transmitting the light, wherein the first and second emission transmitting means are optically connected in series through the optical transmission line.

8. A particle measuring apparatus according to claim 1, further comprising second emission transmitting means for emitting a light in response to incidence of the ionizing radiation, and transmitting the light.

9. A particle measuring apparatus according to claim 1, further comprising an optical transmission line for interconnecting the photoreceptive means, to which a wavelength converting material is added, wherein the optical transmission line passes through the emission transmitting means and the neutron/charged particle converting means.

10. A particle measuring apparatus according to claim 1, wherein the signal processing means includes a time-to-pulse height converting circuit to receive as input an output signal from the photoreceptive means, and a multi-channel analyzer to receive as input a pulse signal from the time-to-pulse height converting circuit.

11. In a nuclear power plant which generates neutrons according to nuclear fission or nuclear fusion in a nuclear reactor, the nuclear power plant comprising:

a particle measuring apparatus including neutron emission transmitting means having a neutron/charged particle converting portion to generate charged particles in response to incidence of the neutrons, and an emission transmitting portion to emit light in response to incidence of the charged particles and to transmit the light, the charged particles generated from the neutron/charged particle converting portion being incident on the emission transmitting portion, and photoreceptive means for receiving the transmitted light travelling through a plurality of different transmitting paths, wherein particles are measured as a function of a time difference between light travelling through each different transmitting path reaching the photoreceptive means, and as a function of a quantity of light; and power control means for controlling power of the nuclear reactor depending upon the result of measurement in the particle measuring apparatus.

12. A nuclear power plant according to claim 11, wherein the neutron/charged particle converting portion is provided in a linear form so as to intersect the neutron, and the photoreceptive means being connected to both ends of the neutron/charged particle converting portion.

13. A nuclear power plant according to claim 11, wherein the emission transmitting means is a solid scintillator, the neutron/charged particle converting means being a granular neutron converter, and the neutron emission transmitting means being formed by adding the neutron converter to the scintillator.

14. A nuclear power plant according to claim 11, wherein a plurality of the photoreceptive means whose number is identical with that of the transmitting paths are provided.

15. A nuclear power plant according to claim 11, wherein a plurality of neutron emission transmitting means are provided.

16. A nuclear power plant according to claim 11, wherein the transmitting path includes the emission transmitting portion, and an optical transmission line for connecting the emission transmitting portion and the photoreceptive means.

17. A nuclear power plant according to claim 16, further comprising a second emission transmitting portion to emit a light in response to incidence of ionizing radiation, and transmit the light, wherein the first and second emission transmitting portions are optically connected in series through the optical transmission line.

18. A nuclear power plant according to claim 11, further comprising a second emission transmitting portion to emit a light in response to incidence of ionizing radiation, and transmit the light.

19. A nuclear power plant according to claim 11, further comprising an optical transmission line for interconnecting the photoreceptive means, to which a wavelength converting material is added, wherein the optical transmission line passes through the neutron emission transmitting means.

20. A nuclear power plant according to claim 11, wherein signal processing means includes a time-to-pulse height converting circuit to receive as input an output signal from the photoreceptive means, and a multi-channel analyzer to receive as input a pulse signal from the time-to-pulse height converting circuit.

21. A nuclear power plant according to claim 11, wherein the particle measuring apparatus is disposed along a core axis of the nuclear reactor.

22. A nuclear power plant according to claim 11, wherein the particle measuring apparatus is disposed in the nuclear reactor.

23. A method for particle measurement comprising the steps of:

generating charged particles in response to the incidence of neutrons;

emitting light in response to the incidence of said generated charged particles, and transmitting the light;

receiving said transmitted light at a photoreceptive portion through at least two different transmitting paths; and measuring charged particles as a function of a time difference between light travelling through each different transmitting path reaching the photoreceptive portion, and as a function of a quantity of light.

* * * * *